Feb. 11, 1958    A. L. CONSALVI    2,823,373
TOROIDAL CORE ASSEMBLY
Original Filed Nov. 30, 1954
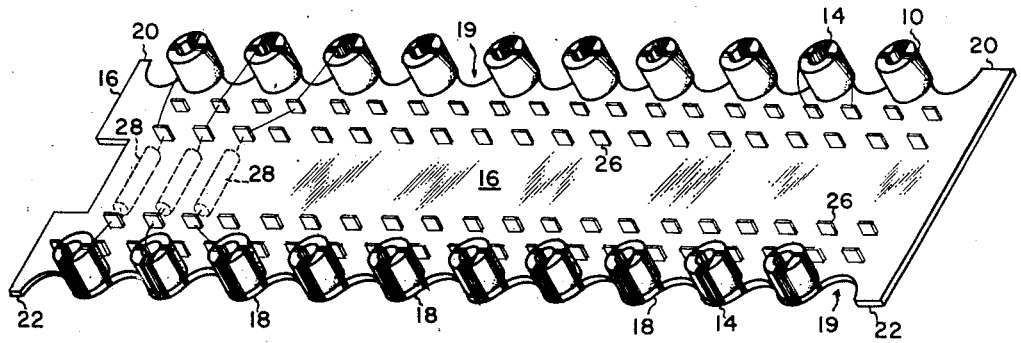
Fig.1
Fig.2
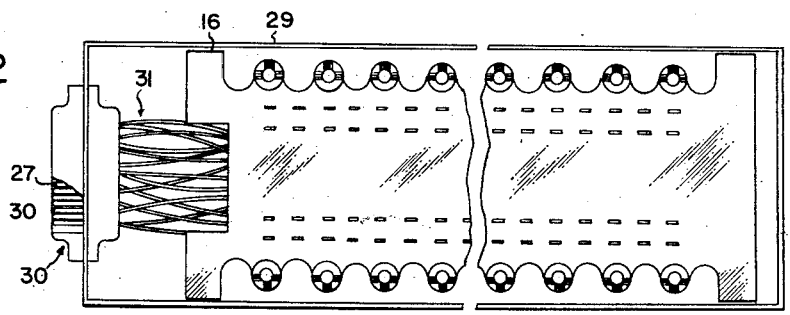
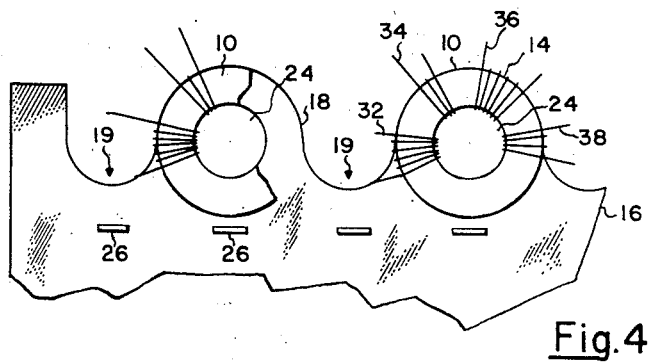
Fig.4
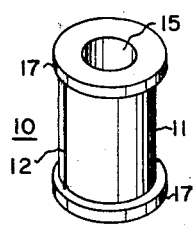
Fig.3
*INVENTOR.*
ANTHONY L. CONSALVI
BY
*Raymond B. Parker*
ATTORNEY United States Patent Office 2,823,373
Patented Feb. 11, 1958

2,823,373

TOROIDAL CORE ASSEMBLY

Anthony L. Consalvi, Havertown, Pa., assignor to Burroughs Corporation, Detroit, Mich., a corporation of Michigan Continuation of application Serial No. 472,037, November 30, 1954. This application October 16, 1956, Serial No. 616,322

8 Claims. (Cl. 340—174)

This invention relates to the packaging of electrical components and more particularly to the packaging of a plurality of toroidal magnetic cores upon a mounting panel, and is a continuation of the copending U. S. patent application S. N. 472,037, filed November 30, 1954, in the name of Anthony L. Consalvi, and assigned to the same assignee as the present application.

It has heretofore been proposed by John Paul Jones in the copending application, Serial Number 472,135, filed November 30, 1954, for Magnetic Core Mounting Assembly, that a mounting panel assembly be provided for toroidal magnetic cores. The panel included apertures adjacent the margins of the panel for registering with the centers of hollow cores so that windings could be introduced through the core and panel and wound about the edge of the panel for re-entry through the core. In this manner the cores are supported adjacent the margins of the panel for convenient wrapping of winding turns thereon and the windings themselves serve to affix the cores to the panel to present a unitary assembly or package.

In the foregoing package, however, it is usually desirable to pass several separate windings about the cores. This requirement caused multiple windings to be wound one over another about a small portion of the toroidal core and frequently resulted in undesirable electrical interaction between different circuits coupled to the windings and excessive leakage inductance which would disturb the magnetic properties of the cores. These undesirable properties however are not presented by windings which are distributed upon different sectors of the cores.

Accordingly it is an important object of the invention to provide an improved magnetic core assembly or package.

It is a more specific object of the invention to provide an improved package for mounting toroidal magnetic cores on a panel to receive a plurality of windings separately dispersed in different sectors of the core.

In accordance with one embodiment of the invention, there is provided a flat panel member having a plurality of scallops or tongues extending along one or more edges thereof. Each scallop is provided with a central aperture which is registrable with the hollow center of an associated toroidal core. By this configuration it is possible to mount the cores on the tongues or scallops and to make available as much as 180 degrees or more of the toroidal core for the windings so that several windings may be wound on the core through the registering holes of the core and scallop and at the same time occupy separate individual sectors of the core. Not only are the cores secured to the panel in this manner but because the windings are not wound over each other the assembly exhibits improved electrical properties. Moreover, the mounting of the cores on the projecting tongues presents them in convenient position for applying the windings to the cores.

A more detailed description of the invention follows with reference to the accompanying drawing, in which:

Fig. 1 is a perspective view of a toroidal core package embodying the invention;

Fig. 2 is a plan view of a broken away mounting panel with accompanying plug and shield;

Fig. 3 is a perspective view of a magnetic core body such as is used in the core package of Fig. 1; and Fig. 4 is a diagrammatic view, partly broken away, of a mounting structure proposed by the invention.

Throughout the respective views like reference characters are used to identify similar features in order to simplify comparison. Accordingly the mounting structure of Figs. 1 through 4 are discussed simultaneously.

A typical magnetic core 10 is shown in Fig. 3. In general, the core body comprises an insulating member or bobbin 11 which may be of ceramic or other refractory material about which is wrapped a strip 12 of magnetizable material. The bobbin is provided with a bore or hole 15 therethrough and may be provided as shown with circular end flanges 17—17 for retaining the strip 12 therebetween.

A mounting panel 16, forming a supporting member for certain of the components hereinafter described, is provided which is preferably flat and rectangular as shown and formed of electrically insulating nonmagnetizable material. The longitudinal side margins of the panel are provided with a plurality of scalloped edges or tongues 18 each containing a centrally disposed aperture 24. Each tongue preferably exhibits an arc extending for approximately 220 degrees about its center and a radius substantially equal to the radius of the outside dimensions of the core. Upon each scallop a ring-like or annular toroidal magnetic core 10 is placed having its hollow center 15 in registration with the scallop aperture 24. The magnetic cores 10 are held in place on their respective tongues by means of several electrically energizable windings 14 which are passed through the registered apertures 15 and 24 and around the edges of the scallops 18.

Because of the cut-away portions or notches 19 of the panel between adjacent scallops 18, a large peripheral arc of each toroidal core is presented for receiving the windings. Thus several separate windings may be disposed upon different sectors of the core to prevent overlap, and thereby improve the electrical properties of the assembly by reducing leakage flux and circuit interaction. This is evident in Fig. 4 where four windings identified at 32, 34, 36 and 38 are placed around each core and the tongue upon which it is mounted. Any heat generated in the windings may also be more readily dissipated than when the windings are either bunched together about a small sector or overlapped upon one another.

As shown in Fig. 2 a finished package assembly may include a shield or frame member 29. The panel 16 can in this manner provide a complete electrical circuit including cores 10 with associated windings 14 and other circuit components 28 where necessary. The panel 16 may be supported in the frame 29 by any suitable means such as brackets and screws (not shown). The windings 14 of the cores 10 are connected to the lugs 26. Plug-in operation of the device is provided for by means of the plug 30 having a series of terminals 27. Interconnections may be made from the panel 16 to the plug 30 by means of the conductors 31. These conductors connect the terminal lugs 26 mounted along the panel 16 to the terminals 27 of the plug 30.

It is seen from the foregoing description that an improved toroidal core package is provided by the invention. By placing a separate core on an individual scallop and then threading the windings simultaneously through the registering apertures not only can the various windings be separated one from another in sectors about the core but there is also provided a simpler and more efficient means for applying the windings to the cores by virtue of the increased handling area provided by the projecting tongues. Better air circulation and a more easily serviced electrical package results from the within described core mounting device. Accordingly those novel features believed descriptive of the invention are defined with particularity in the appended claims.

What is claimed is:

1. A magnetic core package assembly comprising, in combination, a mounting panel of electrically insulating non-magnetizable material having a scalloped edge each scallop of which has a central aperture, a plurality of toroidal magnetic cores placed upon the scallops with the apertures of the cores and the scallops in registry, and a plurality of separate windings about each core extending through the registered apertures and around the scallop with which the core is associated with the windings dispersed in different sectors of the scallop.

2. A magnetic core assembly comprising, in combination, a supporting panel formed of electrically insulating non-magnetizable material having a main body and an edge portion with at least one scallop projection extending from the edge of the main body portion and defining a central aperture, a toroidal magnetic core placed upon the scalloped projection so that an arc of at least substantially 180 degrees about the core extends beyond the main body portion and the apertures of the scalloped projection and toroidal core are in registry, and at least one winding commonly extending through the two apertures and about the scalloped projection and distributed over a substantial portion of said arc.

3. A magnetic core assembly comprising, in combination, a supporting member formed of electrically insulating non-magnetizable material having a scalloped edge portion, each of the scallops of said edge portion having a peripheral rim defining an aperture, a separate magnetic core of annular formation positioned on an individual scallop of said edge portion with the bore of the core in axial alignment with the aperture, and a toroidal winding surrounding the core and the scallop on which the core is positioned and acting to hold the core onto the scallop.

4. A magnetic core assembly comprising a plurality of circular magnetic cores, a flat panel-like core supporting member formed of electrically insulating non-magnetizable material and having an edge portion, said edge portion having a plurality of arcuate portions projecting therefrom, each arcuate portion having a radius substantially equal to that of the cores and having an aperture therethrough, separate ones of the cores being centered on separate ones of the arcuate portions of the supporting member with the bore of the core in axial alignment with the aperture, and an electrically energizable winding tightly encircling each associated core and the arcuate portion and in this manner acting to secure the cores to the supporting member.

5. A magnetic core mounting device comprising, in combination, an electrically insulating, non-magnetizable supporting member, a plurality of tongues integral with said supporting member and projecting from at least one edge of the supporting member, the central portion of each tongue having an aperture, a plurality of ring-like magnetic cores, individual cores positioned on individual tongues with the holes of the cores opening into the apertures of the tongues, and windings encircling said cores extending through the apertures and tightly around the edges of said tongues to securely mount the cores upon the tongues.

6. A magnetic core assembly comprising, a supporting panel formed of electrically insulating non-magnetic material and having an edge portion with at least one projection extending therefrom and an aperture therethrough, a toroidal magnetic core mounted upon said projection with the bore of the core aligned with said aperture, and an electrically conductive winding threaded through said bore, said aperture, and around said projection to secure said core to the panel.

7. A magnetic core assembly comprising, a plurality of circular magnetic cores, a flat panel-like core supporting member formed of electrically insulating non-magnetizable material and having a plurality of arcuate projections extending from an edge portion thereof, each arcuate projection having a radius substantially equal to that of the cores and an axially aligned aperture, separate ones of the cores being centered on separate ones of the arcuate projections of the supporting member with the bore of the core in axial alignment with the aperture, and an electrically energizable winding tightly encircling each associated core through the bore thereof and through the arcuate projection and in this manner acting to secure the cores to the supporting member.

8. A magnetic core assembly comprising a plurality of circular magnetic cores, a flat panel-like core supporting member formed of electrically insulating non-magnetizable material and adapted to receive a plurality of magnetic cores on opposite edge portions thereof, a plurality of arcuate projections extending from the edge of said panel and having apertures therethrough, each arcuate projection having a radius substantially equal to that of the cores, separate ones of the cores being centered on separate ones of the arcuate projections of the supporting member with the bore of the core in axial alignment with the aperture, and an electrically energizable winding tightly encircling each associated core and the arcuate portion so as to secure the cores to the supporting member.

References Cited in the file of this patent

UNITED STATES PATENTS

| 2,704,842 | Goodell et al. | Mar. 22, 1955 |
| 2,741,757 | Devol et al. | Apr. 10, 1956 |
| 2,783,416 | Butler | Feb. 26, 1957 |